United States Patent [19]
Spector

[11] Patent Number: 5,842,714
[45] Date of Patent: Dec. 1, 1998

[54] BICYCLE POWER PACK

[76] Inventor: Donald Spector, 380 Mountain Rd., Union City, N.J. 07080

[21] Appl. No.: 827,949

[22] Filed: May 2, 1997

[51] Int. Cl.[6] ........................................................ B62H 1/00
[52] U.S. Cl. ........................................ 280/288.4; 362/72
[58] Field of Search ................................ 280/288.4, 200, 280/281.1; 224/425; 315/77, 82; 322/1; 362/61, 72, 198, 199, 202, 368, 370

[56] References Cited

U.S. PATENT DOCUMENTS

| | | | |
|---|---|---|---|
| 2,944,833 | 7/1960 | Wintermantel et al. | 280/288.4 X |
| 4,814,951 | 3/1989 | Larsen | 362/72 |
| 5,149,112 | 9/1992 | Nauman | 280/288.4 X |
| 5,197,795 | 3/1993 | Mudrovicm | 280/288.4 X |
| 5,426,792 | 6/1995 | Murasko | 362/72 |

Primary Examiner—Douglas C. Butler
Assistant Examiner—C. T. Bartz
Attorney, Agent, or Firm—Michael Ebert

[57] ABSTRACT

A d-c power pack incorporated within the frame of a bicycle and adapted to supply operating power to a plurality of accessories such as head and tail lamps and a safety helmet worn by the bicyclist and provided with an electronic device. The bicycle frame includes front and rear tubes bridged by upper and lower tubes to define a trapezoidal structure. The power pack is formed by a cartridge received within a section of the lower tube of the frame, the cartridge containing a set of rechargeable battery cells serially connected to an output terminal linked by an internal line to a bank of parallel-connected outlets mounted along the upper tube of the frame. Each accessory is provided with a cable terminating in a plug insertable in a respective outlet whereby the accessory is powered through this outlet. To recharge the power pack, a recharger having a similar cable is plugged into one of the outlets.

9 Claims, 2 Drawing Sheets

BICYCLE POWER PACK

BACKGROUND OF THE INVENTION

1. Field of Invention

This invention relates generally to d-c power packs for bicycles to supply operating power to electrically-powered accessories associated with the bicycle, and more particularly to a power pack of this type which is incorporated within the frame of the bicycles and is protectively concealed thereby.

2. Status of Prior Art

A modern bicycle includes a frame coupled to front and rear wheels, handle bars for steering the front wheel and pedals adapted to drive the rear wheel through a chain and sprocket mechanism.

Most bicycle riders not only use their bicycle during daylight hours, but often at dusk and at night. The bicyclist therefore requires a headlamp for illuminating the road, and a tail lamp to signal the presence of the bicycle to vehicles behind the bicycle. Such lamps and other accessories associated with the bicycle, such as a horn, each require a d-c power supply.

While it is possible to provide each accessory with its own set of batteries, this has distinct drawbacks. Thus a good headlight needs a 6 volt lamp and for this purpose one needs four 1.5 volt batteries connected in series.

Should one use four AA cells for this purpose in a compact unit, the power capacity of these small cells is low, and the batteries will be quickly exhausted. Should one use four C or D cells having a much larger power capacity, then the space requirements of these cells rule out their inclusion in a self-contained headlamp.

To overcome this drawback and to provide adequate d-c power for a bicycle lighting system, the 1997 Davis U.S. Pat. No. 5,597,227 discloses a battery pack that is attachable to the frame of a bicycle. This pack is encapsulated in a jacket of compressible material which is pressed into an open cage secured to a cross tube on the frame; the pack being electrically-connected to a bicycle head lamp.

The main drawback of the Davis battery pack is that it is unprotected, and is exposed not only to changing weather conditions, but also to any intruder who when the bicycle is unattended, can without difficulty remove and walk away with the power pack.

The same problem arises with the rechargeable battery unit for bicycle illumination disclosed in Spingler U.S. Pat. No. 4,325,108. This unit is bolted to a post supporting the handle bar of the bicycle and can be detached therefrom as easily as it is attached thereto.

The Mudrovich U.S. Pat. Nos. 4,970,630 and 5,197,795 disclose a bicycle power pack to supply power to head and tail lamps. The pack takes the form of a cylindrical battery holder which is wedged between front and rear sections of the bicycle frame and therefore requires no screws or clamps to install. But a battery holder of this type is exposed and unprotected, and can easily be removed from the frame by an intruder.

The Clark U.S. Pat. No. 4,833,777 points out that batteries for bicycles which are placed in an externally mounted holder leaves the batteries out in the open, making it easy for a thief to remove. Moreover an exposed mounting for batteries, in order to be strong enough to stand up to road shocks, must be bulky and heavy. To overcome these drawbacks, Clark places his batteries inside the rear tube in the frame of the bicycle in which is telescoped the post of the seat or saddle. But since this tube is mostly occupied by the seat post, the lower the seat, the less room there is for the batteries.

Similarly, in Larson, U.S. Pat. No. 4,814,951, the lighting system for a bicycle places the batteries for powering the system in the frame tube in which the post of the saddle is inserted.

SUMMARY OF INVENTION

In view of the foregoing, the main object of this invention is to provide a high capacity d-c power pack for a bicycle to supply power to a plurality of accessories, the power pack being incorporated within the frame of the bicycle and being protectively concealed thereby.

More particularly, an object of this invention is to provide a power pack of the above type having multiple outlets, each capable of supplying power to a respective accessory associated with the bicycle.

Among the significant features of the invention are the following:

A. The power pack is installed in an elongated, normally vacant tube included in the frame of the bicycle, which tube can accommodate several large diameter battery cells having a large power capacity.

B. Because the power pack is provided with multiple outlets mounted on the frame of the bicycle, it is feasible to plug into these outlets cables connected not only to lamps and other accessories mounted on the bicycle, but also accessories worn by the bicyclist, such as a safety helmet equipped with lights and electronic equipment.

C. The power pack is not external to the structure of the bicycle and therefore does not interfere with its operation.

D. The power pack which is provided with rechargeable batteries is nested in a removable section of a tube included in the bicycle frame, and should it become necessary to replace the batteries, one need only remove this section.

Briefly stated, these objects are attained by a d-c power pack incorporated within the frame of a bicycle and adapted to supply power operating to a plurality of accessories such as head and tail lamps and a safety helmet worn by the bicyclist and powered with electronic equipment. The bicycle frame includes front and rear tubes bridged by upper and lower tubes to define a trapezoidal structure of high strength.

The power pack is formed by a cartridge received within a section of the lower tube of the frame, the cartridge containing a set of rechargeable battery cells serially linked to an output terminal connected by an internal line to a bank of parallel-connected outlets mounted along the upper tube of the frame. Each accessory is provided with a cable terminating in a plug insertable in a respective outlet whereby the accessory is powered through this outlet. To recharge the power pack, a recharger provided with a similar cable is plugged into one of the outlets.

BRIEF DESCRIPTION OF DRAWING

For a better understanding of the invention as well as other objects and further features thereof, reference is made to the following detailed description to be read in conjunction with the accompanying drawings, wherein.

DESCRIPTION OF INVENTION

Figure 1:
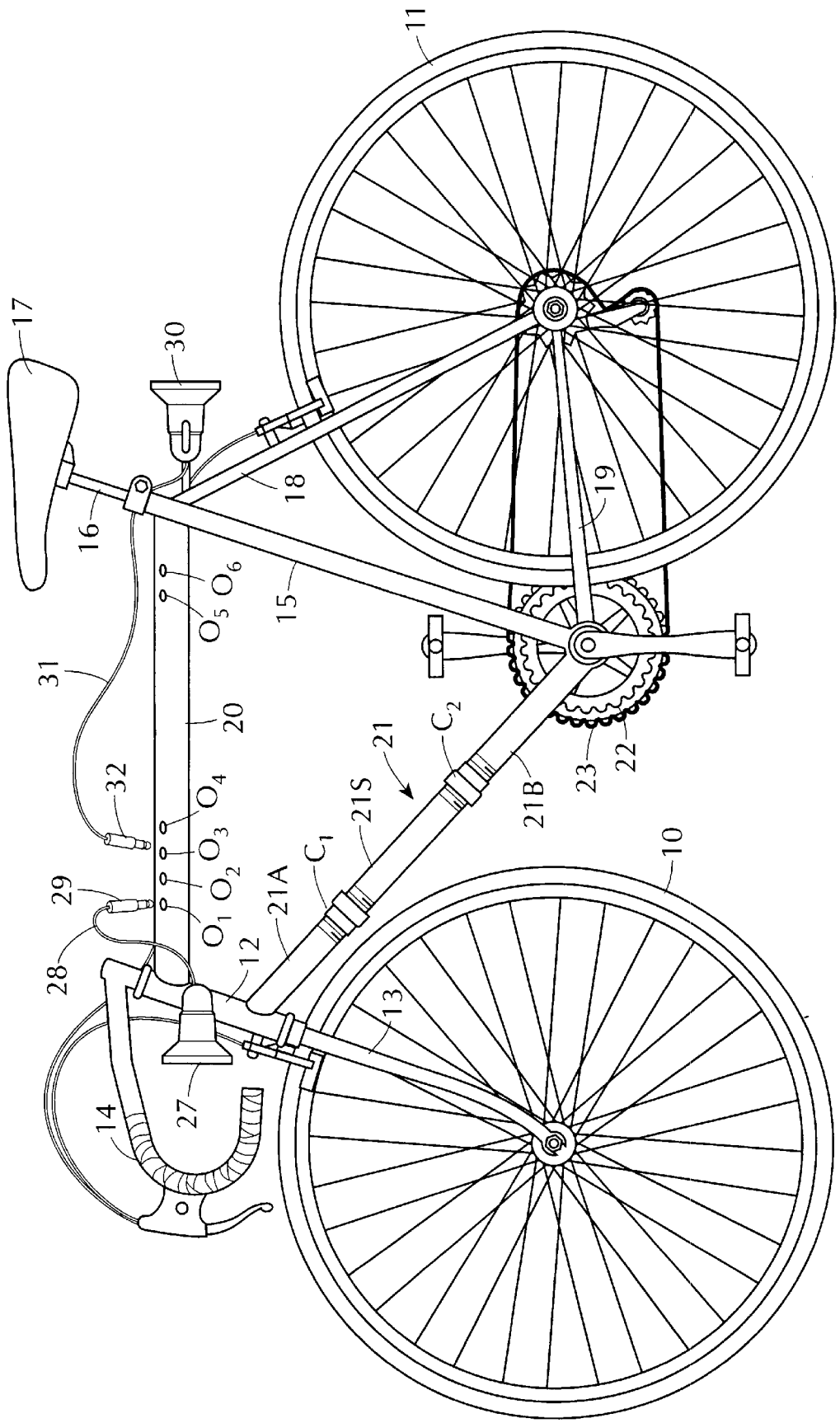
FIG. 1 illustrates a bicycle whose frame has incorporated therein a d-c power pack in accordance with the invention.

FIG. 1 illustrates a bicycle in accordance with the invention having a power pack installed therein which is incorporated within the frame of the bicycle and is therefore protectively concealed. The power pack is provided with multiple outlets to supply power to a plurality of different accessories.

The bicycle includes a front wheel 10 and a rear wheel 11. The metal frame of the bicycle, formed of tubular elements that are welded together, includes a front tube 12 below which is a fork 13 supporting the axle of the front wheel 10. The handle bars 14 are joined to a steering post that goes through front tube 12 and is joined to fork 13 so that the front wheel can be steered by the handle bars.

Also included in the frame is a rear tube 15 in which is telescoped the post 16 on which the saddle 17 is mounted so that the saddle may be raised or lowered. Stays 18 and 19 extending from the upper and lower ends of rear tube 15 form a triangle at whose apex rear wheel 11 is supported.

Bridging front tube 12 and rear tube 15 are an upper tube 20 and a lower tube 21. Upper tube 20 extends between the upper ends of tubes 12 and 15 while lower tube 21 extends between the lower ends of these tubes to define a trapezoidal structure. Supported for rotation at the junction of tubes 15 and 21 is a sprocket wheel 22 which by means sprocket chain 22 drives rear wheel 11.

Upper tube 20 is substantially horizontal whereas lower tube 21 which is downwardly inclined is provided with a removable section 21S. Removable section 21S is provided at its opposite ends with internally threaded coupling rings $C_1$ and $C_2$ which engage the externally threaded ends of the fixed sections 21A and 21B of tube 21. Hence to remove section 21S, one has only to turn rings $C_1$ and $C_2$ which engage the externally-threaded ends of the fixed sections 21A and 21B of tube 21 to advance further onto the ends of fixed sections 21A and 21B so as disengage the ends of removable section 21S.

Figure 2:
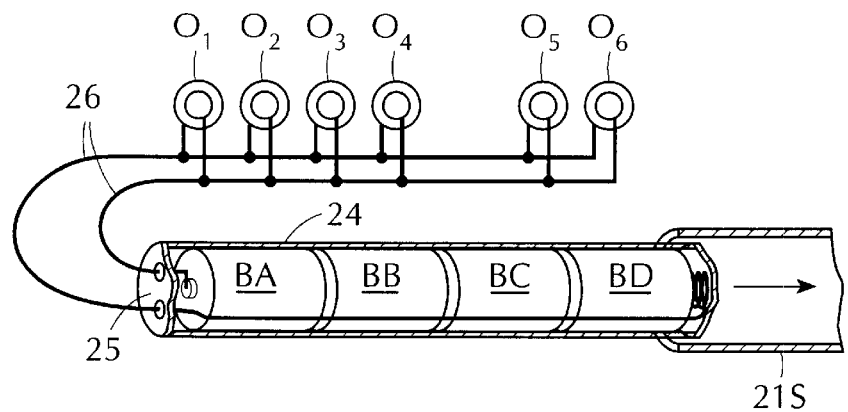
FIG. 2 is a schematic diagram of the power pack.

Received within removable sections 21S of the frame, as shown in FIG. 2, is a cartridge having a cylindrical casing 24 formed of plastic or other electrical insulation material, within which is housed a set of rechargeable cylindrical battery cells BA, BB, BC and BD. The battery cells are connected in series to an output terminal 25 mounted at one end of the cartridge.

The battery cells are preferably heavy duty rechargeable C or D cells. Hence the cartridge housing these cells may be similar to that of flashlight containing such cells. Each cell has a 1.5 volt output; hence the serially connected cells in the cartridge provide terminal 25 with a six volt output appropriate to lamps and other electrically-powered accessories which operate at this voltage.

Terminal 25 is connected by a line 26 running through or along the frame to a bank of outlets $O_1$ to $O_6$. These are connected in parallel relation and are distributed along the upper tube 20 of the frame. In practice, the outlets may be mounted on an insulation strip set into the metal tube. While a two wire line 26 is shown, in practice only a single wire is required, the conductive metal frame serving as the second wire.

The outlets are in socket form adapted to receive a plug inserted therein to connect the outlets to whatever accessories are associated with the bicycle.

Thus attached to the front end of the bicycle is a 6 volt headlight 27 whose beam is projected forwardly, the headlight having a cable 28 terminating in a plug 29 adapted to be inserted in any one of the like outlets. At the rear of the bicycle is attached a 6 volt tail light 30 whose cable 31 terminates in a plug 32. Other accessories, such as horns and directional signals may be attached to the bicycle and powered by the power pack through the outlets. In practice since the outlets are all along the upper tube, the cables leading to these outlets can be strapped to this tube.

Figure 3:
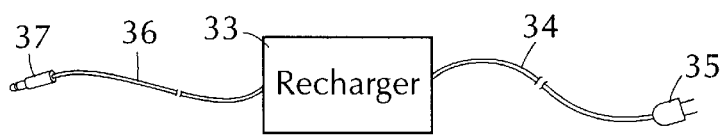
FIG. 3 shows a recharger for the power pack.

When it becomes necessary to recharge the power pack, use may be made of a six volt recharger 33, as shown in FIG. 3, adapted to step-down and rectify a 110 Vac power line voltage. The charger 33 is provided with a cable 34 terminating in a plug 35 which plugs into an a-c line outlet and a cable 36 which terminates in a plug 37 which is inserted in a 6 volt outlet on the frame.

Hence when it is necessary to recharge the power pack, the bicyclist takes his bicycle into his home garage where the recharger is kept, plugs the recharger into the a-c power line, and inserts the d-c output plug 37 into an outlet on the frame of the bicycle.

Figure 4:
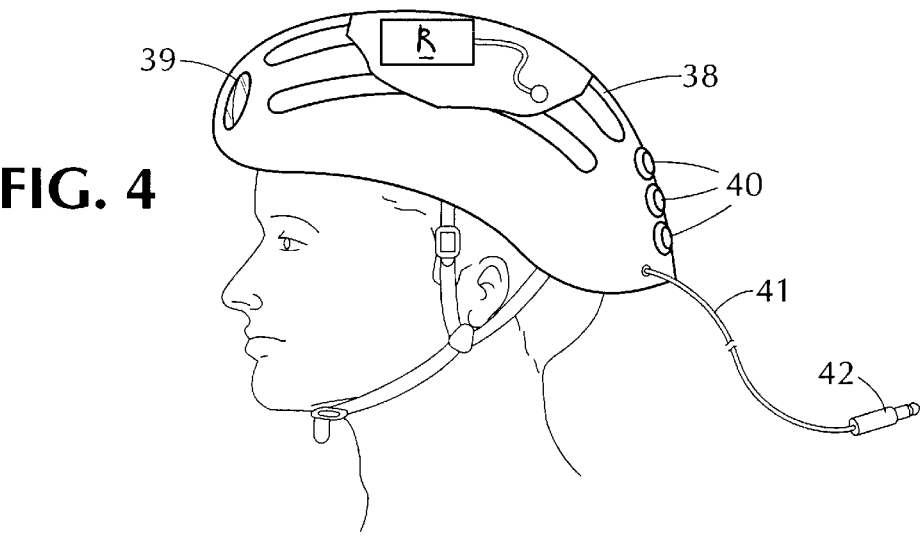
FIG. 4 is a safety helmet accessory which is powered by the power pack.

A bicyclist is well advised to wear a safety helmet 38 as shown in FIG. 4. And when the safety helmet is worn at night, it is desirable that this helmet be equipped with a front white light 39 and rear red lights 40.

This provides an added measure of security for then one is made aware of the bicyclist, as well as the bicycle on which the bicyclist is riding.

Inasmuch as helmet 38 is provided with a cable 41 and a plug 42 that is insertable in an outlet on the frame of the bicycle it is not necessary therefore for the helmet to be weighed down by batteries, and one can equip the helmet with other d-c powered equipment, such as a radio R installed in the roof of the helmet above the head of the wearer. Or one may install in the helmet a compact public address amplifier; a microphone and a loud speaker, making it possible for the wearer of the helmet to converse with other bicycle riders wearing a similar helmet.

In the frame arrangement shown in FIG. 1, the diameter of the removable section 21S of the frame tube 21 is the same as the diameter of the fixed sections 21A and 21B. Hence this arrangement is limited to a power pack cartridge whose diameter makes it telescopable into removable section 21S.

Figure 5:
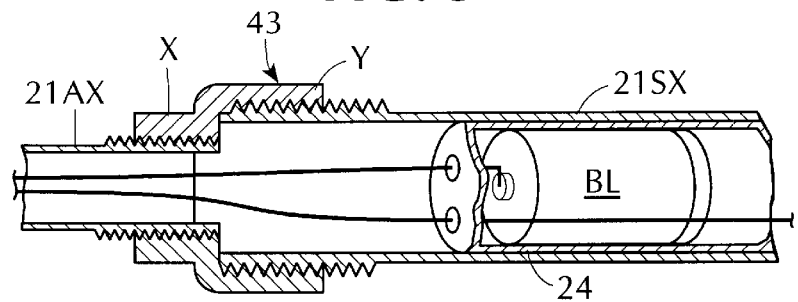
FIG. 5 is a modified form of frame to accommodate a large power pack.

To accommodate batteries having a larger diameter, one may use the frame arrangement shown in FIG. 5, in which the removable section 21SX of the frame has a larger diameter than the diameter of the fixed section 21AX to accommodate large-diameter batteries BL.

In order to couple the large diameter removable section to a smaller diameter fixed section, use is made of a coupler 43, as shown in FIG. 5 having an internally-threaded small diameter section X which is threadably received on the externally threaded end of fixed tube 21AX, and an internally threaded large diameter section Y threadably received on the externally-threaded end of the large diameter removable tube section 21SX. Hence to detach the removable section one turns this coupler into the fixed section 20 that it disengages the removable section.

A bicycle in accordance with the invention which incorporates within its frame a d-c power pack not only provides ample power for several accessories associated with the bicycle, but it also affords a measure of security, for the power pack is concealed and others are not aware of its existence and will not be tempted to steal it.

While there has been shown preferred embodiments of a bicycle power pack in accordance with the invention, it is to be appreciated that many changes may be made therein without departing from the spirit of the invention. Thus the helmet may be equipped with a radio beacon making it possible to locate the position of a traveling bicyclist from a home station.

I claim:

1. A bicycle having incorporated therein a d-c power pack adapted to supply operating power to a plurality of bicycle accessories; said bicycle comprising:

A. a frame including a front tube adapted to receive a steering post, a rear tube adapted to receive a seat post, and upper and lower tubes bridging the front and rear tubes to define a trapezoidal structure;

B. a cartridge disposed within a section of the lower tube of the frame, said cartridge containing a set of battery cells connected in series to an output terminal across which an output voltage is yielded; and C. at least one outlet mounted on the upper tube and linked to the output terminal whereby an accessory having a cable terminating in a plug which is insertable in said outlet is then powered by output voltage, the section of the lower tube in which the cartridge is received being removable from fixed sections of this lower tube.

2. A bicycle as set forth in claim 1, in which the removable section of the tube is coupled to the fixed sections thereof by internally-threaded rings at either end of the removable section.

3. A bicycle as set forth in claim 2, in which the removable section has a larger diameter than the fixed sections.

4. A bicycle as set forth in claim 1, in which the cartridge is formed by a cylindrical insulating casing having the set of said cells received therein in series, the output terminal being at one end of the casing.

5. A bicycle as set forth in claim 1, having a bank of outlets mounted along the upper tube, one for each of said plurality of accessories.

6. A bicycle is set forth in claim 1, in which one of said accessories is a headlight attached to said bicycle.

7. A bicycle as set forth in claim 6, in which another of said accessories is a tail light.

8. A bicycle as set forth in claim 1, in which the accessory is a safety helmet having at least one external light.

9. A bicycle as set forth in claim 8, in which the helmet has at least one internal electronic device powered from an outlet of said upper tube.

* * * * *